United States Patent [19]
Hancock

[11] Patent Number: 5,898,975
[45] Date of Patent: May 4, 1999

[54] MULTI-PURPOSE HOLDER

[76] Inventor: Dennis Hancock, 5752 N. Silverstone Cir., Mountain Green, Utah 84050

[21] Appl. No.: 09/010,152

[22] Filed: Jan. 21, 1998

[51] Int. Cl.$^6$ .................................................. A47B 95/02
[52] U.S. Cl. ...................... 16/114 R; 16/116 A; 16/125; 16/DIG. 12; 24/306; 24/442
[58] Field of Search ................................ 16/114 B, 114 R, 16/111 R, 116 R, 116 A, 125, DIG. 12; 38/95; 2/20, 158–160; 473/568; 81/177.1, 489; 24/306, 442, 265 C, 16 R, 16 PB

[56] References Cited

U.S. PATENT DOCUMENTS

| | | | |
|---|---|---|---|
| 1,008,604 | 11/1911 | Lake | 16/125 |
| 2,274,605 | 2/1942 | Hoffmeister | 16/125 |
| 4,262,385 | 4/1981 | Normal | 16/125 |
| 4,599,920 | 7/1986 | Schmid | 81/489 |
| 4,958,758 | 9/1990 | Tipple et al. | 24/306 |

Primary Examiner—Chuck Y. Mah

[57] ABSTRACT

A multi-purpose holder with a flexible block having a guide surface for securement and for attachment to a variety of surfaces, including similar surfaces of others of the same multi-purpose holder and as a guide for a strap and an opposite gripping surface with a central, wide V-groove and parallel, narrow side V-grooves adjacent wings forming a continuation of the gripping surface of the block and having gripping surfaces thereon to engage an object positioned in the central, wide V-groove as the strap is tightened around the flexible block, the wings and the object.

7 Claims, 2 Drawing Sheets

MULTI-PURPOSE HOLDER

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to devices to releasably secure objects of variable size and shape together and more particularly to hold an object to a flat or curved surface or such that held objects extend in either a selected parallel relationship or a selected transverse relationship.

In the past devices to secure object together have been proposed. U.S. Pat. No. 3,679,530, Perina, for example discloses a holder having an endless band of elastic material connected to a support member that is made of a semi-rigid material. Opposed marginal edges of the support member are deflected into engagement with an object being held within the endless band of material, while the central portion of the support member, containing rearwardly projecting hooking elements remains in a substantially flat planar condition to be attached to a loop element bonded to a wall or the like.

U.S. Pat. No. Des. 188,000, Shanok, et al. shows a design of a support for a flashlight or similar article that has a base from which arms with rolled pieces on the free ends thereof project to grasp a flashlight cylinder.

U.S. Pat. No. 2,716,284, O'Neil, discloses a handle shaped holder for a flashlight wherein an elastic band that passes over the flashlight barrel has opposite sides thereof releasably hooked to the handle.

None of the previously identified patents disclose a holder having a flexible base, wrap-around flexible arms projecting from the base and strap means to fit around the base and the arms to secure the arms around an object to be securely grasped by both the arms and the body. Consequently, the prior art devices, while possibly suitable for the specific purposes for which they are intended, do not provide the holding ability of the present invention for a wide ranging variety of devices.

Pairs of the prior art devices obviously can be connected to hold a pair of objects in a spaced relationship, even though such an arrangement may not be specifically disclosed by the prior art. U.S. Pat. No. Des. 293,206, Beaty, et al, U.S. Pat. No. Des. 298,739, Richards, and U.S. Pat. No. Des. 367,999, McCallum disclose holders for securing pairs of objects in spaced apart relationship using oppositely facing spring or resilient clips extending from a central base member. The holders shown in these prior art patents hold the interconnected objects in parallel extending relationships and are not disclosed as being alternatively able to hold the objects in a transversely extending relationship.

Another commercially available holder for a pair of objects comprises a flexible block with spaced apart, transversely extending slots passing therethrough. Straps having hook portions and loop portions are inserted through the slots and are locked around transversely extending objects held in cradles formed at opposite ends of the flexible block.

BRIEF SUMMARY OF THE INVENTION

Principal objects of the present invention are to provide a multi-purpose holder capable of securing objects of varying configuration to a variety of surfaces or other like or dissimilar objects in a variety of interlocked relationships.

Other objects are to provide an economically produced holder that will not scratch or mar objects gripped, while securely holding the objects.

Principal features of the invention include a block of resilient material having one flat surface between spaced apart shoulders and an opposite gripping surface with a wide central V-groove and a pair of sharp side V-grooves extending parallel to the wide central V-groove when the block is in a relaxed state. The central V-groove receives and centrally positions objects to be gripped by the holder. A pair of wing-shaped gripper elements each project from an opposite edge of the gripping surface and extend along an upper edge of a side V-groove.

Each wing-shaped V-groove has spaced apart, parallel ribs on a surface forming a continuation of the gripping surface of the block of resilient material.

A strap fits snugly between the shoulders at opposite sides of the flat surface and the ends of the strap reach around the wings to be locked together. Preferably, the strap fastener is made of hooked and looped material of the type commercially known by the trademark "VElCRO". An object positioned to be cradled in the central, wide V-groove is secured to the holder by the ends of the strap being snugged around the wings to pull the wings tightly around the object being secured and then the ends of the wings are locked together. As the wings are snugged around the object the side V-grooves close and permit flexing of the block to further secure the object in place.

Equally spaced holes are formed through the block adjacent to the ends of the side V-grooves. The holes are each countersunk from the gripping surface so that heads of screws inserted through the holes will be recessed into the block. The equally spaced holes allow a pair of bases to be secured together with screws or bolt and nut assemblies and to allow the bases to be rotated ninety degrees with respect to one another, if desired. Consequently, the bases can be arranged to allow objects held by the attached holders to be parallel to one another or to be rotated such that secured objects extend transverse to one another.

Additional objects and features of the invention will become apparent to those skilled in the art to which the invention pertains from the following detailed description and drawings.

DETAILED DESCRIPTION OF THE INVENTION

Figure 1:
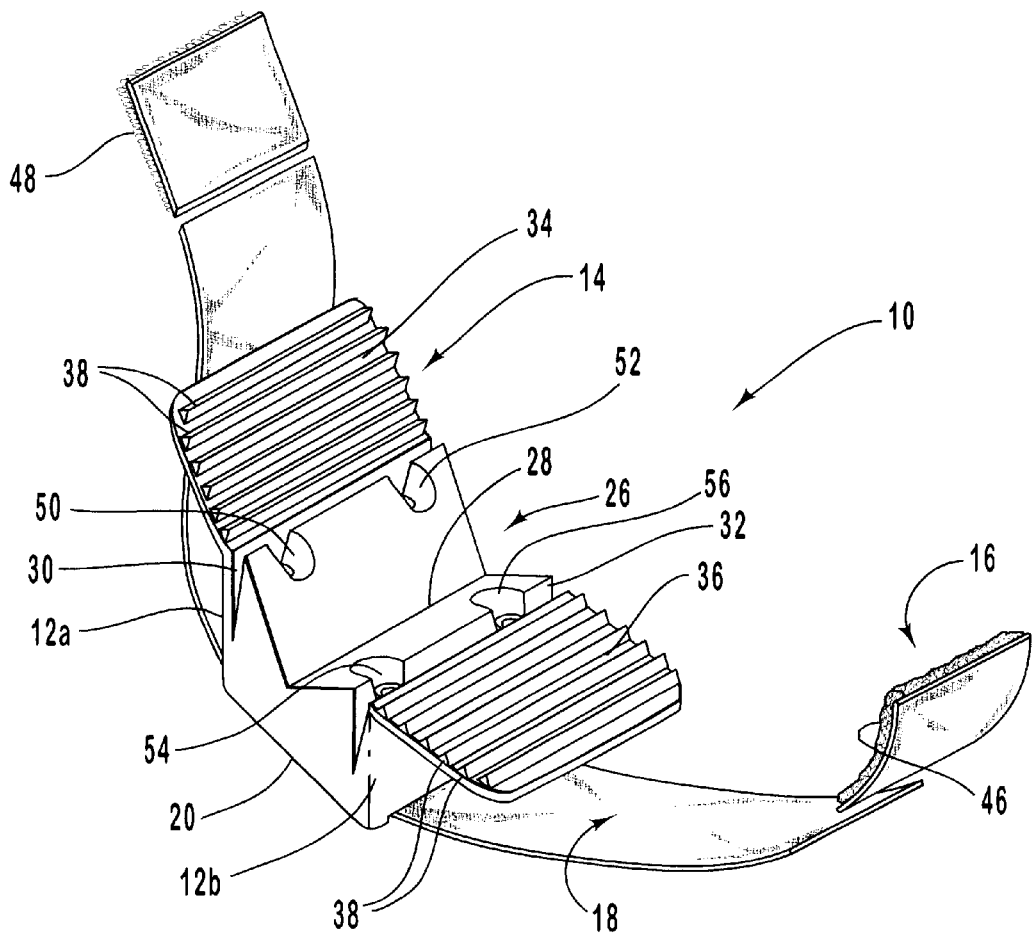
FIG. 1, is a perspective view of the holder of the invention.
Figure 2:
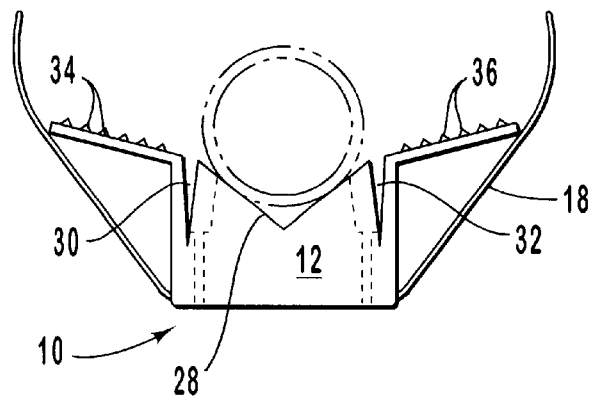
FIG. 2, a side elevation view.
Figure 3:
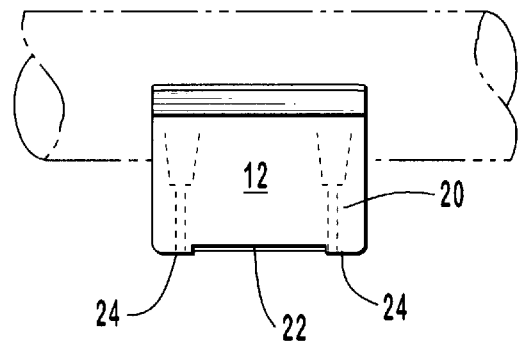
FIG. 3, an end elevation view.

Referring now to the drawings:

In the illustrated preferred embodiment of the invention the holder, shown generally at 10 includes a block 12, wings 14 and 16, formed integrally with the block and a strap 18.

Block 12 and wings 14 and 16 are formed integrally of resilient rubber or plastic material. Block 12 includes a back surface 20, comprising a flat surface 22 between spaced apart shoulders 24 and an opposed gripping surface 26. The gripping surface 26 includes a central, wide V-groove 28 and side, narrow V-grooves 30 and 32 all in parallel relationship and with the wide V-groove between the spaced apart narrow V-grooves.

Wings 14 and 16 each have a gripping surface 34 and 36, respectively, that forms a continuation of the gripping surface 26 and opposite ends 12a and 12b of block 12. The wings are made from the same material as the block 12 and respectively project from edges of the block outside the edges of the narrow V-grooves 30 and 32. Spaced apart, parallel ribs 38 project from the gripping surfaces 34 and 36 of the wings 14 and 16 to better grip objects positioned in the wide V-groove 28 as the ends of strap 18 are wrapped around the wings 14 and 16.

Strap 18 is wedged between shoulders 24 and against the flat surface 22. The opposite ends 39 and 40 of the strap 18 are respectively passed around the wings 14 and 16 and around an object 44, positioned in the central wide V-groove and are then brought together to be locked and to secure object 44 in place. It is preferred that the strap 18 have one end with looped material 46 thereon and that the other end have hook material 48 thereon so that the ends are locked together by engagement of the looped material with the hook material. It will be apparent that other straps, having other locking means can be used, if desired.

Figure 4:
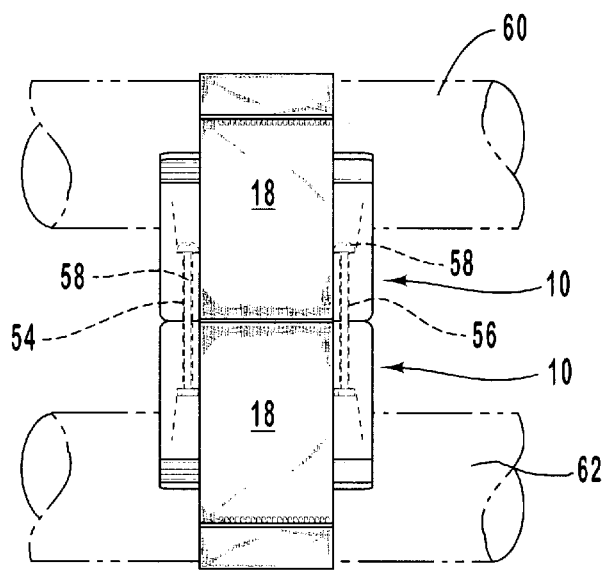
FIG. 4, an end elevation view of interconnected holders securing a pair of objects extending in parallel relationship.
Figure 5:
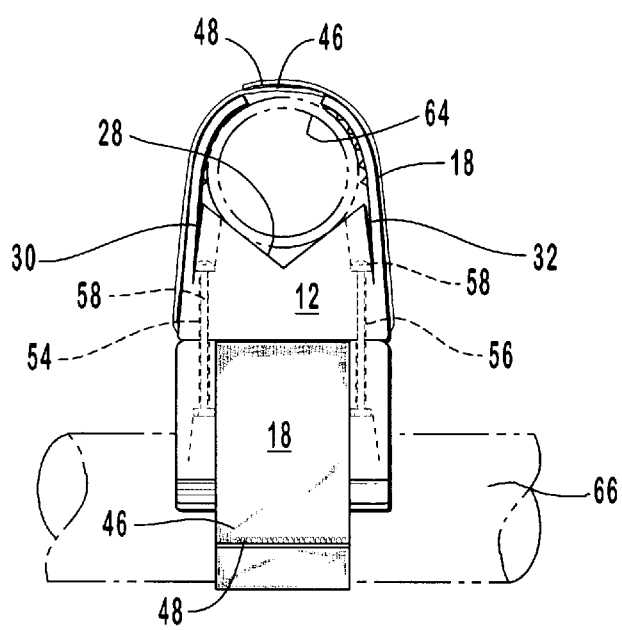
FIG. 5, a side elevation view of a first holder, connected to a second holder and with the holders securing objects extending in transverse relationship.

Equally spaced, parallel extending holes 50, 52, 54 and 56 are formed through the block 12 and the holes are countersunk from the gripping surface to allow the head of a screw 58 (or bolt) inserted into each hole to be recessed into the block. The screws and bolts can be used to attach a holder 10 to a wall surface or other surface to which an object held by the holder is to be attached. The screws and/or bolts can also be used to secure the block 12 of one holder 10 to the block 12 of another holder 10 with the screws or bolts being inserted through the holes 50, 52, 54, and 56 of one block 12 and into the holes 50, 52, 54, and 56 of another block 12. So arranged, the connected blocks 12 can secure a pair of objects in a spaced apart relationship by positioning one object in each holder. As shown in FIG. 4, a pair of cylindrical objects 60 and 62, which may be of different sizes are secured by interconnected holders 10 in a parallel relationship. Typically the objects secured together in this fashion may be a gun barrel and a flashlight; a tool and a light; a pair of support rods, etc. Because the holes 50, 52, 54, and 56 are equally spaced through each block 12, interconnected blocks 12 can also be interconnected when one is rotated ninety degrees with respect to the other, such that objects 64 and 66 held by the holders 10 can extend transversely with respect to one another. It will be apparent that if different patterns of equally spaced holes are provided through the blocks of connected holders, different angular relationship will be obtained between objects held by the interconnected holders.

Although a preferred embodiment of the invention has been herein disclosed, it is to be understood that such disclosure is by way of example and that other variations are possible without departing from the subject matter coming within the scope of the following claims, which subject matter I regard as my invention.

I claim:

1. A holder for objects comprising
   a block of resilient material having a substantially flat surface formed between spaced apart shoulders, said flat surface extending from one end to an opposite end of said block and a central, wide, V-groove formed in a surface of said block opposite to the flat surface to form a gripping surface; and
   a strap extending across said flat surface between said shoulders and across said ends of said block to bend said ends of said block toward one another as the straps are interlocked around an object positioned in the wide V-groove.

2. A holder as in claim 1, further including
   a pair of narrow, side V-grooves, extending parallel to the central, wide V-groove, with each said side V-groove being on a side of said central wide V-groove, and said side V-grooves having said central, wide V-groove between them.

3. A holder as in claim 2, further including
   a pair of flexible wings, each said wing projecting from one of said ends of the block at the junction of the gripping surface and the ends of the block adjacent the narrow, side V-grooves, each said wing having a gripping surface thereon forming a continuation of the gripping surface of said block.

4. A holder as in claim 3, wherein
   the flexible wings and the block are formed integrally of the same flexible material.

5. A holder as in claim 4, wherein
   the flexible wings have spaced apart ribs projecting from the gripping surface of the wings.

6. A holder as in claim 5, wherein
   the wings projecting from the ends of the block extend angularly away from the block and away from the flat surface of the block such that the strap passes around the wings and folds the wings around an object positioned in the central, side V-groove when the ends of the strap are locked together.

7. A holder as in claim 6, wherein
   one end of the strap has loop material thereon and the opposite end of the strap has hook material thereon, whereby said loop and hook portions interlock the ends of the strap together.

* * * * *